United States Patent
Namaky et al.

(10) Patent No.: US 7,135,964 B2
(45) Date of Patent: Nov. 14, 2006

(54) DATA LINK CONNECTOR (DLC) DRIVEN DISPLAY

(75) Inventors: Hamid Namaky, South Russell, OH (US); Thomas F. Slater, II, Gates Mills, OH (US)

(73) Assignee: SPX Corporation, Charlotte, NC (US)

( * ) Notice: Subject to any disclaimer, the term of this patent is extended or adjusted under 35 U.S.C. 154(b) by 72 days.

(21) Appl. No.: 10/700,151

(22) Filed: Nov. 3, 2003

(65) Prior Publication Data

US 2004/0095255 A1   May 20, 2004

Related U.S. Application Data

(60) Provisional application No. 60/423,494, filed on Nov. 4, 2002.

(51) Int. Cl.
*B60Q 1/00* (2006.01)

(52) U.S. Cl. ............ 340/438; 340/461; 701/1

(58) Field of Classification Search ......... 340/438, 340/439, 461, 462, 425.5, 456, 815.4; 701/1, 701/33, 51, 201; 307/9.1, 10.1; 73/117.3
See application file for complete search history.

(56) References Cited

U.S. PATENT DOCUMENTS

| | | | |
|---|---|---|---|
| 4,188,618 A | 2/1980 | Weisbart |
| 4,236,213 A | 11/1980 | Richardson |
| 4,291,382 A | 9/1981 | Full et al. |
| 4,302,814 A | 11/1981 | Full et al. |
| 4,309,759 A | 1/1982 | Tokuda et al. |
| 4,395,624 A | 7/1983 | Wartski |
| 4,398,258 A | 8/1983 | Naitoh et al. |
| 4,404,648 A | 9/1983 | Miyakawa et al. |
| 4,442,424 A | 4/1984 | Shirasaki et al. |
| 4,507,706 A | 3/1985 | Trexler, Jr. |
| 4,551,801 A | 11/1985 | Sokol |
| 4,562,545 A | 12/1985 | Hasegawa |
| 4,564,916 A | 1/1986 | Hori et al. |
| 4,594,572 A | 6/1986 | Haubner et al. |
| 4,611,193 A | 9/1986 | Bruggemann |
| 4,630,043 A | 12/1986 | Haubner et al. |
| 4,635,034 A | 1/1987 | Tokuyama et al. |
| 4,646,059 A | 2/1987 | Iwamoto et al. |
| 4,713,762 A | 12/1987 | Igarashi |
| 4,725,838 A | 2/1988 | Maschek et al. |
| 4,804,937 A | 2/1989 | Barbiaux et al. |
| 4,817,040 A | 3/1989 | Bodley-Scott |
| 4,862,365 A | 8/1989 | Onesti |
| 5,309,139 A * | 5/1994 | Austin ............... 340/462 |
| 5,469,137 A | 11/1995 | Muto |
| 5,750,886 A | 5/1998 | Lambert et al. |
| 5,908,455 A | 6/1999 | Parvahan |
| 5,949,330 A | 9/1999 | Hoffman et al. |

(Continued)

OTHER PUBLICATIONS

Nology Products—Online Catalog (www.nology.com/products)—4 pgs. Apr. 15, 2003.

*Primary Examiner*—Van T. Trieu
(74) *Attorney, Agent, or Firm*—Baker & Hostetler LLP

(57) ABSTRACT

An automotive device for displaying one or more vehicle parameters is provided. The vehicle parameters are retrieved from one or more computers that are on board a vehicle and are connected to the vehicle data bus. The automotive device includes a processor, a display and a connector. The connector releasably connects to a vehicle data bus allowing the processor to retrieve data from the vehicle data bus and output to the data to display one or more vehicle parameters.

34 Claims, 7 Drawing Sheets

U.S. PATENT DOCUMENTS

| | | |
|---|---|---|
| 6,172,602 B1 | 1/2001 | Hasfjord |
| 6,175,789 B1 * | 1/2001 | Beckert et al. ............... 701/33 |
| 6,259,981 B1 | 7/2001 | Wilcosky |
| 6,263,269 B1 | 7/2001 | Dannenberg |
| 6,272,402 B1 | 8/2001 | Kelwaski |
| 6,393,379 B1 * | 5/2002 | Gumbel ...................... 702/183 |
| 6,401,029 B1 * | 6/2002 | Kubota et al. .............. 701/201 |
| 6,404,163 B1 | 6/2002 | Kapsokavathis et al. |
| 6,441,510 B1 * | 8/2002 | Hein et al. .................. 307/10.1 |
| 6,511,342 B1 * | 1/2003 | Hein et al. .................. 439/502 |
| 6,587,759 B1 * | 7/2003 | Obradovich et al. ............ 701/1 |
| 6,601,442 B1 * | 8/2003 | Decker et al. .............. 73/117.3 |
| 6,614,385 B1 * | 9/2003 | Kuhn et al. .................... 342/51 |
| 6,781,512 B1 * | 8/2004 | Hayashi et al. ............. 340/456 |
| 6,871,121 B1 * | 3/2005 | Tomson ......................... 701/1 |
| 2001/0013826 A1 | 8/2001 | Ahmed et al. |

* cited by examiner

DATA LINK CONNECTOR (DLC) DRIVEN DISPLAY

CROSS-REFERENCE TO RELATED APPLICATIONS

This application claims priority to U.S. Provisional Application No. 60/423,494 filed on Nov. 4, 2002 entitled Data Link Connector (DLC) Driven Display, which is hereby incorporated by reference in its entirety.

FIELD OF THE INVENTION

The present invention relates generally to electrical instrumentation systems and, more particularly, to automotive gauge displays driven by a vehicle diagnostic data bus.

BACKGROUND OF THE INVENTION

Modern vehicles typically have a vehicle diagnostic system, including one or more separate computer control modules. Examples of such computer control modules (also known as just "modules") are: a powertrain control module (PCM), an engine control module (ECM), a transmission control module (TCM), an ABS control module, and an air bag control module. Typically the computer control modules are connected together by a data link, forming the vehicle diagnostic system. The data link typically has a connection point, or data link connector (DLC) located in the cockpit of the vehicle. Typically the vehicle diagnostic system is used to proved relevant information to repair technicians. The DLC provides repair technicians with a place to connect off-board vehicle diagnostic devices, such as scan tools and code readers to the vehicle diagnostic system.

"Off-board devices," such as scan tools and code readers are known in the art. Scan tool and code reader testing devices interface with vehicle diagnostic systems to, e.g., access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09.

There are different types of scan tools. An "OBD II Scan Tool" complies with the above-identified specifications. By contrast, a "Manufacturer-Specific Scan Tool" is a scan tool that accesses and displays proprietary manufacturer-specific data (and possibly also additionally accesses and displays OBD II data). Examples of proprietary manufacturer-specific data include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

Typically, scan tools are capable of performing at least some of the following major functions: "View Data," also known as "Live Data," "Data," and "Data Test, DTC" (viewing and displaying in real-time live changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.).

Modern vehicles are generally equipped with numerous sensors, such as, for example, oil pressure, coolant temperature, transmission temperature, engine temperature, etc. Typically, most of the sensors are connected to a computer control module that continually monitors the sensors and regulates the vehicles functions accordingly. Generally the information generated by the sensor is continually passed along the vehicle data link as part of the vehicle diagnostic system. Thus, the scan tools are capable of reading, in real time, many parameters of the vehicle operation, such as, for example, speed, oil pressure, coolant temperature, engine revolutions per minute, and battery charging voltage because the parameters are continually updated and passed along on the vehicle data bus.

Many car enthusiasts, backyard mechanics, and hobbyists are not satisfied with the limited instrumentation, such as, for example, the number of gauges and warning indication lights, commonly referred to as "dummy lights," that are standard features on many automobiles, and often desire to add additional display gauges to their automobiles. Examples of typical gauges that are added by car enthusiasts are tachometers showing engine revolutions per minute, oil pressure gauges, oil temperature gauges, coolant temperature gauges, coolant pressure gages, etc. Installing these additional gauges, however, can be a complicated endeavor.

Generally, the additional gauges are typically connected in one of two ways. In the first, the car enthusiast locates the correct wiring and splices the new gauge wiring into the existing sensor wiring. Locating the correct wires and following them to a convenient splice point is a difficult task and requires knowledge, time, patience, and skill that some individuals simply do not have. Moreover, this greatly complicates the task of writing comprehensive instructions because many models and makes of automobiles require individually tailored instructions to account for differences in diagnostic system configurations. In addition, if the splice is not correctly performed and properly sealed, the gauge will fail to work, and the connection between the sensor and the onboard computer may be degraded, resulting in the possible malfunction of that sensor, and possibly affecting operation of the internal combustion system. In addition, over time the splice connection might fail due to the constant vibrations within the automotive environment. The second common way to connect additional gauges is to add additional sensors to the automobile. Adding additional sensors is a complicated process, which involves mounting the sensor, connecting power to the sensor, and routing the wire to the new gauge. The skill that is required to perform this task is beyond that of many individuals. Therefore, there exists a need for a gauge display device that does not suffer the aforementioned deficiencies.

SUMMARY OF THE INVENTION

The present invention is directed toward vehicle gauge displays that connect to the vehicle diagnostic systems via a data link connector (DLC) and display the desired vehicle operating parameters. A vehicle gauge or gauge cluster that can be easily installed in a vehicle and connected to the vehicle data bus without the need to add new sensors or splice into the existing wire is described herein. The vehicle gauge or gauge cluster can be connected to the electrical system without the use of complicated wiring diagrams.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE DRAWINGS

Figure 1:
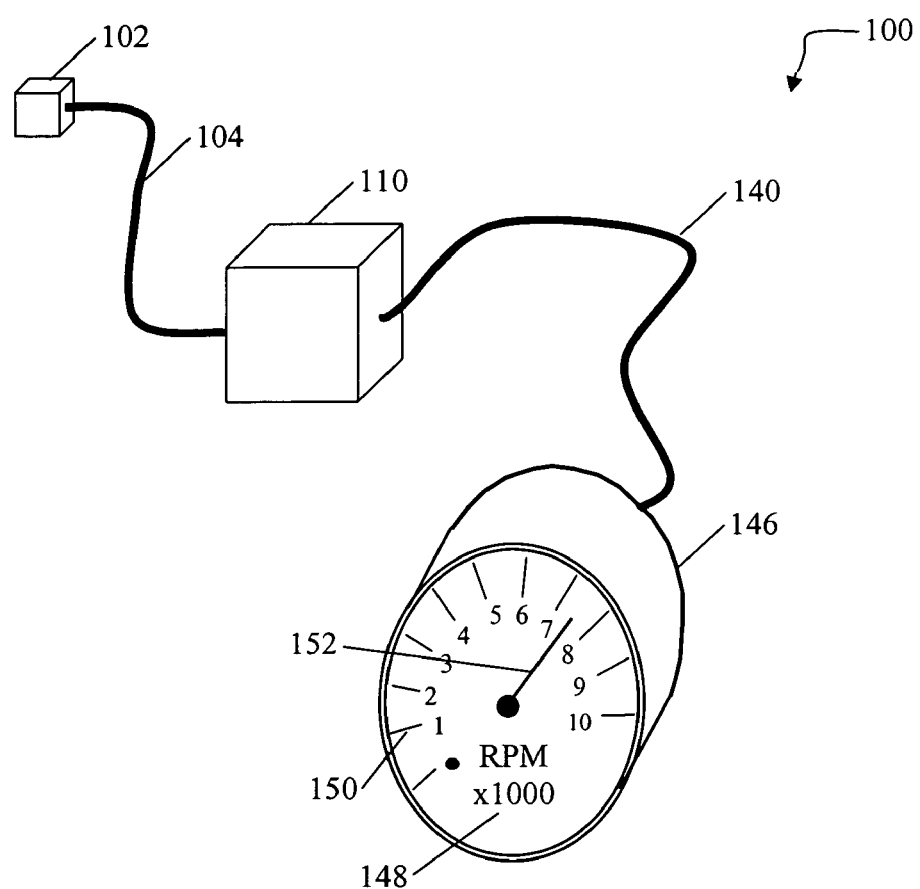
FIG. 1 is a schematic view of a first embodiment of a DLC driven display with a single analog gauge display.

In general, the DLC driven gauge system includes a DLC driven display interface that interfaces between a vehicle diagnostic system and one or more additional vehicle visual display devices. The DLC driven display interface communicates with, and receives vehicle parameters from, one or more control units in the vehicle diagnostic system. The DLC driven display interface converts the vehicle parameter(s) to a form suitable for display on the one or more additional vehicle visual display devices, and transmits the vehicle parameter(s) to the one more visual display devices for display thereon. "Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, for example, a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Additional" vehicle visual display device, includes visual display devices that are installed in addition to the usual instrument cluster or instrument suite associated with the vehicle. Usual instrument clusters typically include a speedometer, odometer and possibly coolant temperature, oil pressure and battery voltage instrumentation. Exemplary additional vehicle visual display devices include, for example, analog gauges, analog bar graphs, numeric digital readouts, digital gauges (e.g., gauges implemented using discrete digital displays, for example, LEDs, similar to the displays shown in U.S. Pat. No. 29/153,263, or gauge images displayed on a graphical display unit), digital bar graphs, etc. The displays can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. Exemplary vehicle parameter displays implemented using the DLC driven gauge system include, for example, tachometers showing engine revolutions per minute, oil pressure gauges, oil temperature gauges, coolant temperature gauges, coolant pressure gauges, horsepower gauges, torque gauges, and fuel economy gauges.

Figure 4:
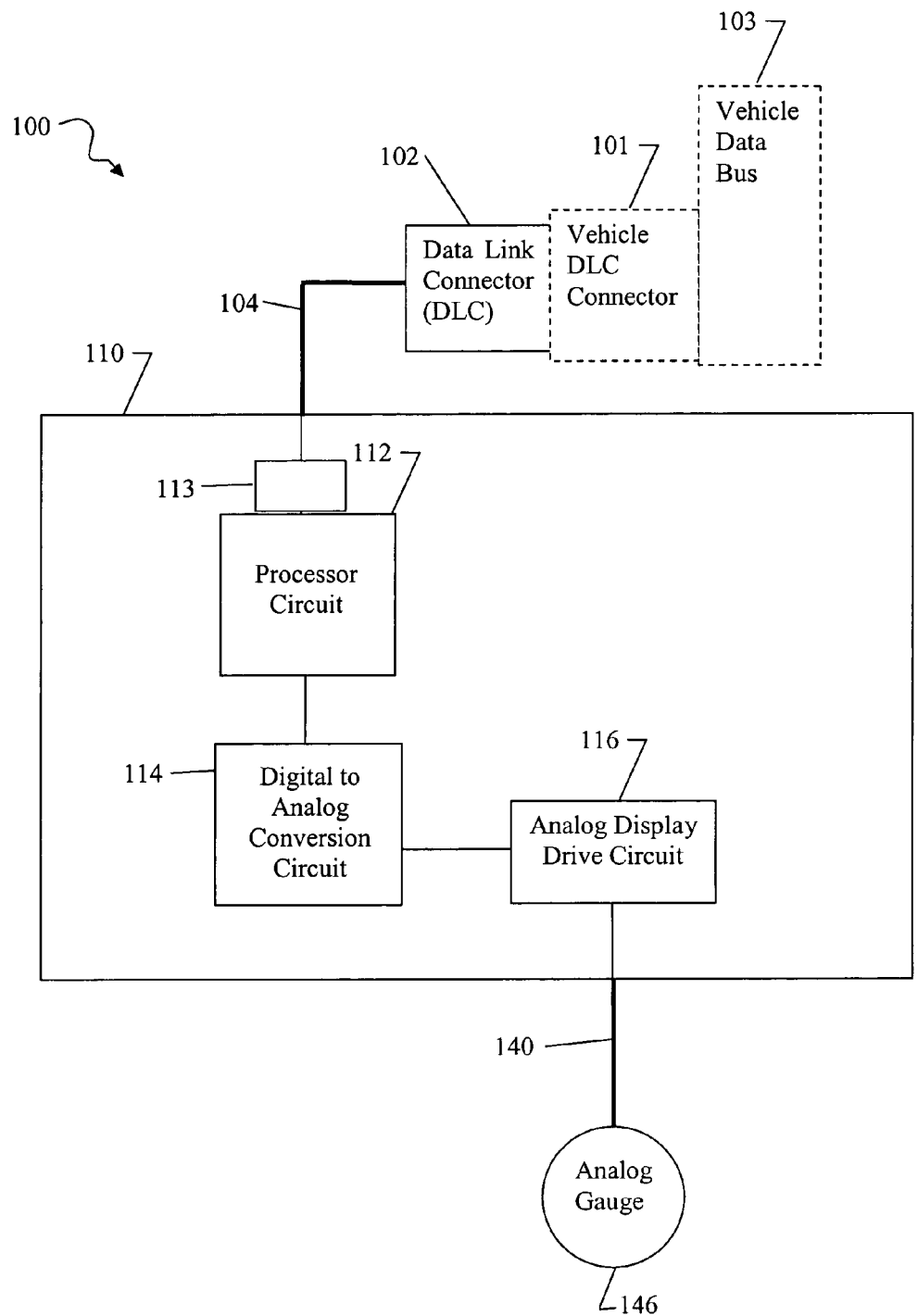
FIG. 4 is a high level block diagram of the first embodiment of the DLC driven display of FIG. 1.

Referring to FIGS. 1 and 4, a first embodiment of a data link connector (DLC) driven gauge system 100 is illustrated. The DLC driven gauge system 100 includes a data link connector 102, such as for example an OBD II connector, a DLC driven display interface 110, an analog gauge 146, all in circuit communication. The DLC 102 is placed in circuit communication with the DLC driven display interface 110 by a data link cable 104. The DLC driven display interface 110 is placed in circuit communication with the analog gauge 146 via analog cable 140. The DLC driven gauge system 100 is placed in circuit communication with the existing vehicle diagnostic system data bus 103 (FIG. 4) by connecting the DLC 102 of the DLC driven gauge system 100 to the existing vehicle DLC 101 associated with the vehicle, for example, the vehicle DLC that is located inside the occupant area of the vehicle that is typically used for the connection of a scan tool or code reader for diagnostic purposes.

The DLC driven display interface 110, as will be discussed in more detail below, requests and receives vehicle data via the vehicle diagnostic system data bus 103. The DLC driven display interface 110 is similar to scan tools and code readers in that the DLC drill display interface 110 establishes a communications link with the vehicle diagnostic system, requests vehicle data from the vehicle diagnostic system, and receives the vehicle data transmitted via the vehicle DLC 101. The DLC driven display interface 110 links to the vehicle diagnostic system in virtually any of the known interface methods, such as, for example, using the method set forth in copending U.S. patent application Ser. No. 10/159,957 "Scan Tool with Dropped Communication Detection and Recovery and Improved Protocol Selection," which is assigned to Actron Manufacturing and which is incorporated herein by reference in its entirety. The DLC driven display interface 110 requests, receives, and prepares for display on analog gauge 146 at least one vehicle parameter that is relevant to the desired display, such as, for example, engine speed (in RPM) or oil pressure.

The analog gauge 146 preferably includes a common analog gauge, such as, for example, an analog tachometer (accepting a vehicle tach signal), analog oil pressure gauge (accepting a vehicle oil pressure signal), an oil temperature gauge (accepting a vehicle oil temperature signal), a coolant temperature gauge (accepting a vehicle coolant temperature signal), a fuel level gauge (accepting a vehicle fuel level signal), an ammeter (accepting a vehicle current signal), a voltmeter (accepting a vehicle voltage signal), a vacuum gauge (accepting a vehicle vacuum signal), a fuel pressure gauge (accepting a fuel pressure signal). Such analog gauges typically include an indicating needle 152, graduated markings 150, and some indication of the gauge function and units 148. As known to those skilled in the art, the position of the indicating needle is representative of the analog signal that is input via analog cable 140. Although the gauge 146 is shown as a tachometer, any type of analog gauge is contemplated and within the spirit and scope of the embodiment discussed herein.

Referring now to FIG. 4, the processor 112 is preferably in circuit communication with an associated communications circuit 113, a digital to analog conversion circuit (DAC) 114, and an analog display drive circuit 116. The processor circuit 112, also referred to herein as just processor 112, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit.

The communications circuit 113 generates one or more communications protocols with which the DLC driven display interface 110 and the vehicle computer network communicate with one-another. The communications circuit 113 can be implemented either in hardware, or in software, or in a combination of hardware and software. Typical communications protocols generated by the communication circuit 113 include but are not limited to: SAE J1850 (VPM), SAE J1850 (PWM), ISO 9141-2, and ISO 14230-4 ("Keyword 2000"). The present invention is not intended to be limited to any specific communications protocol, or even to electrical communications protocols. Other present and future protocols, such as fiber optic and wireless communications protocols, are also contemplated as being within the spirit and scope of the present invention.

The processor 112 is preferably in circuit communication with a digital to analog conversion circuit 116. The exact circuitry used to implement the digital to analog conversion circuit 116 is not important and can be virtually any discrete digital to analog converter known in the art, or implemented using a number of components, such as, for example, is described below in reference to FIG. 7. The DAC 114 is preferably in circuit communication with an analog display driver circuit 116. The analog display driver circuit 116 converts the voltage generated by the DAC 114 to a signal capable of driving the analog gauge 146. The relevant vehicle data is transmitted from the processor circuit 112 to the DAC 114 where it is converted to an analog signal. The analog signal is transmitted from the DAC 114 to the analog display drive circuit 116, where it is modified if required to drive the analog gauge 146.

The DLC driven gauge system of the 100 preferably displays a subset of the numerous vehicle parameters available via vehicle data bus 103. Moreover, the different types of analog gauges typically receive different types of signals. For example, a typical analog tachometer expects to input a vehicle tach signal, an analog oil pressure gauge expects to input a vehicle oil pressure signal, an oil temperature gauge expects to input a vehicle oil temperature signal, a coolant temperature gauge expects to input a vehicle coolant temperature signal, a fuel level gauge expects to input a vehicle fuel level signal, an ammeter expects to input a vehicle current signal, a voltmeter expects to input a vehicle voltage signal, a vacuum gauge expects to input a vehicle vacuum signal, and a fuel pressure gauge expects to input a fuel pressure signal. These signals typically have different characteristics, such as, for example, expected voltage ranges, current ranges, frequencies, etc. Accordingly, there is preferably a system or method for limiting which one or more particular vehicle parameter(s) are to be requested and displayed. For example, a particular DLC driven display interface 110 can be tailored (e.g., have processor code and associated DAC 114 and driver circuitry tailored) for one or more specific vehicle parameters. For example, a particular certain DLC driven display interface 110 might be tailored for an analog tachometer, having processor code tailored to request and receive vehicle RPM information and have an associated DAC 114 and driver circuitry tailored to generate a vehicle tach signal. This can be the case for virtually any analog gauge and signal, including but not limited to those listed above. In the alternative, the DLC driven display interface 110 can be more of a general purpose DLC driven display interface 110, with some way of indicating to the DLC driven display interface 110 which one or more particular vehicle parameters are to be displayed and/or upon what type of device the parameter is to be displayed, e.g., a user interface (not shown) in circuit communication with the processor 112. In response, the DLC driven display interface 110 requests the one or more particular parameter from the vehicle diagnostic system and configures the data accordingly via DAC 114 and driver circuit 116 for proper display on that particular display type.

In terms of installing and using the first embodiment, the user either selects a DLC driven display interface 110 tailored to the desired parameter(s) to be displayed, or communicates to a general purpose DLC driven display interface 110 the parameter(s) to be displayed, and the type of display. For example, if the user desires to add an additional tachometer to a vehicle, the user either selects a DLC driven display interface 110 tailored for an analog tachometer, or communicates to a general purpose DLC driven display interface 110 that the parameter to be displayed is engine RPM, and the display device is an analog tachometer. The user mounts the analog gauge 146 in the desired location and connects the DLC 102 to the mating existing vehicle DLC Connector 101. The processor 112 of the DLC driven display interface 110 establishes a communications link with the vehicle diagnostic system via the communications circuit 113, and periodically requests the engine RPM parameter from an appropriate control unit of the vehicle diagnostic system, reads any engine RPM data transmitted back via the DLC 102, converts the RPM data to a format suitable for conversion to a tachometer signal via the DAC 114 and analog display driver 116, generates a tachometer signal via the DAC 114 and analog display driver 116, and outputs a tachometer signal 140, which is displayed via analog gauge 146.

Figure 2:
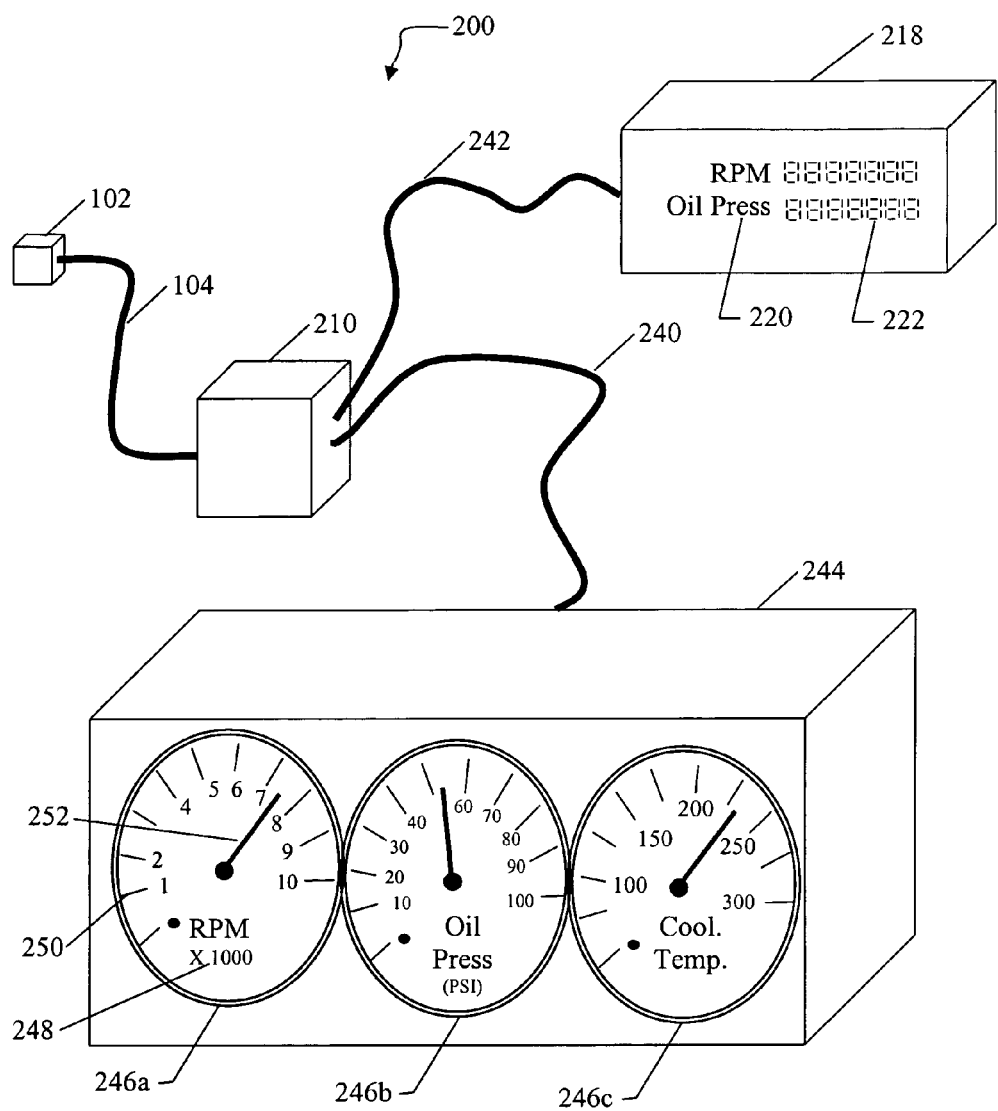
FIG. 2 is a schematic view of a second embodiment of a DLC driven display with a digital readout and an analog gauge cluster.
Figure 5:
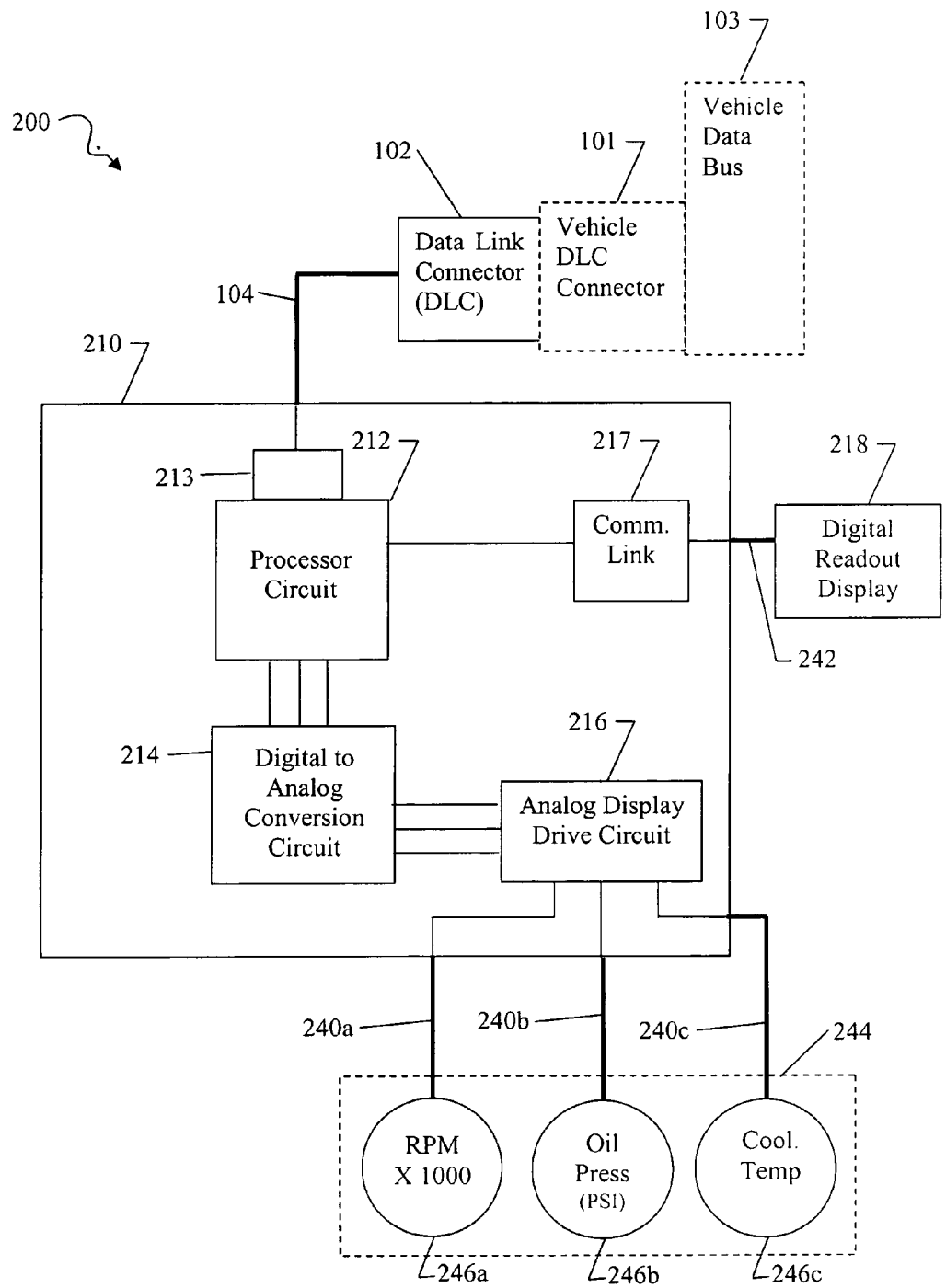
FIG. 5 is a high level block diagram of the second embodiment of the DLC driven display of FIG. 2.

Referring now to FIGS. 2 and 5, a second illustrative embodiment is shown. The embodiment of DLC driven display 200 of FIGS. 2 and 5 is very similar in operation to the aforementioned embodiment illustrated in FIGS. 1 and 4, with the exception that the DLC driven display interface 210 of this embodiment generates a plurality of analog signals 240a, 240b, 240c to drive a plurality of additional analog gauges 246a, 246b and 246c in an additional gauge cluster and further comprises a communications circuit 217 that generates a communications link with an additional digital display 218.

More specifically, the processor 212 is substantially as described above, except that processor 212 executes code to request, receive, and display a plurality of parameters, such as, for example, a plurality of parameters via analog gauges and/or one or more parameters via digital display 218. The DLC communications circuit 213 is substantially as communications circuit 113, described above. The DAC 214 and drive circuit 216 are substantially the same as DAC 114 and driver circuit 116 described above, except the DAC 214 and driver circuit 216 preferably generate a plurality of signals 240a, 240b and 240c suitable for direct display on a plurality of analog gauges 246a, 246b, and 246c. The gauge cluster 244 is comprised of a plurality of gauges 246a, 246b, and 246c. The depiction of three particular gauges is not meant to limit the invention in anyway. Preferably, the gauge cluster has two or more gauges in the gauge cluster. The DLC driven display interface 210 further includes a display communications link 217 and a digital readout display 218. The processor 212 formats desired vehicle data and communicates the formatted data to digital display 218 via communication link 217. The digital display 218 can be virtually any digital display(s) known in the art, such as a liquid crystal display, LCD, a plasma display, light emitting diodes, LEDs etc. The digital display readout, shown in FIG. 2, comprises a title or identification label 220, such as Oil Press., or RPM and a digital readout 222. The digital readout 222 can be numeric, alphanumeric, or graphically indicative of the desired parameters. The identification label 220 can be programmed into and integrated with the display, or printed separately wherein only the actual vehicle parameters are digitally displayed. For example, if the identification label 220 is displayed electronically, the digital display can be sized so that only one parameter is displayed at a time. The user can push a button (not shown) and switch the display to communicate a different vehicle parameter. In the alternative, the display can be programmed to scroll through a plurality of displays, communicating each parameter for a predetermined period of time. The display comprising of 220 and 221 can be integrally housed in the display interface 210 housing or housed separately as shown.

Referring back to FIG. 5. In addition, the processor 212 communicates or transmits the digital data that is relevant to the parameters that are to be displayed on the gauges 246 to the digital to analog conversion circuit 214. The digital signals are converted to analog signals and communicated to the analog display drive circuit 216. Once the analog signals are received, the analog display drive circuit 216 scales each signal and transmits the scaled analog signal to its respective gauge 246.

If, for example, the user desires to add an additional gauge cluster 244 for engine RPM 246a, oil pressure 246b and coolant temperature 246c, as shown in FIG. 2, the user mounts the additional gauge cluster 244 in a convenient location and connects the DLC 102 to the vehicle DLC 101. The processor 212 requests the relevant parameters from the vehicle diagnostic system, receives the data transmitted in response thereto, and transmits the digital data corresponding to the engine RPM, oil pressure and coolant temperature to the digital to analog converter circuit 214. The analog signals are communicated to the analog display drive circuit 216. The display drive circuit scales the analog signal representing engine RPMs and transmits the signal via cable 240a to analog gauge 246a. Similarly the analog signals representing oil pressure and coolant temperatures are scaled and transmitted to analog gauges 246b and 246c via cables 240b and 240c respectively. For convenience and aesthetic purposes, cables 246a, 246b and 246c can be grouped into one larger cable 240. As known to those in the art, each analog gauge 246 has an associated title or identification label 248, graduated markings 250 representing scaled markings indicative of the parameters that are displayed, and an indicating needle 252.

Figure 3:
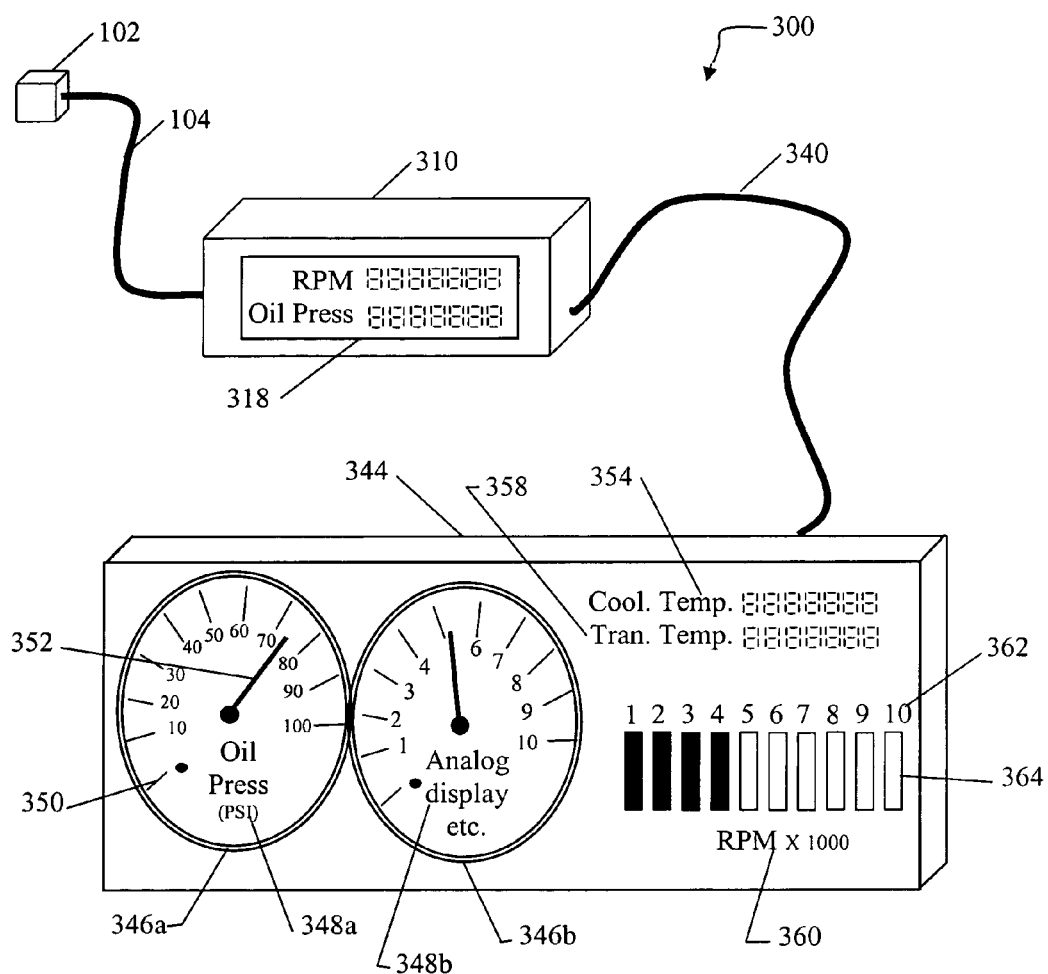
FIG. 3 is a schematic view of a third embodiment of a DLC driven display with a digital readout and a graphics display.
Figure 6:
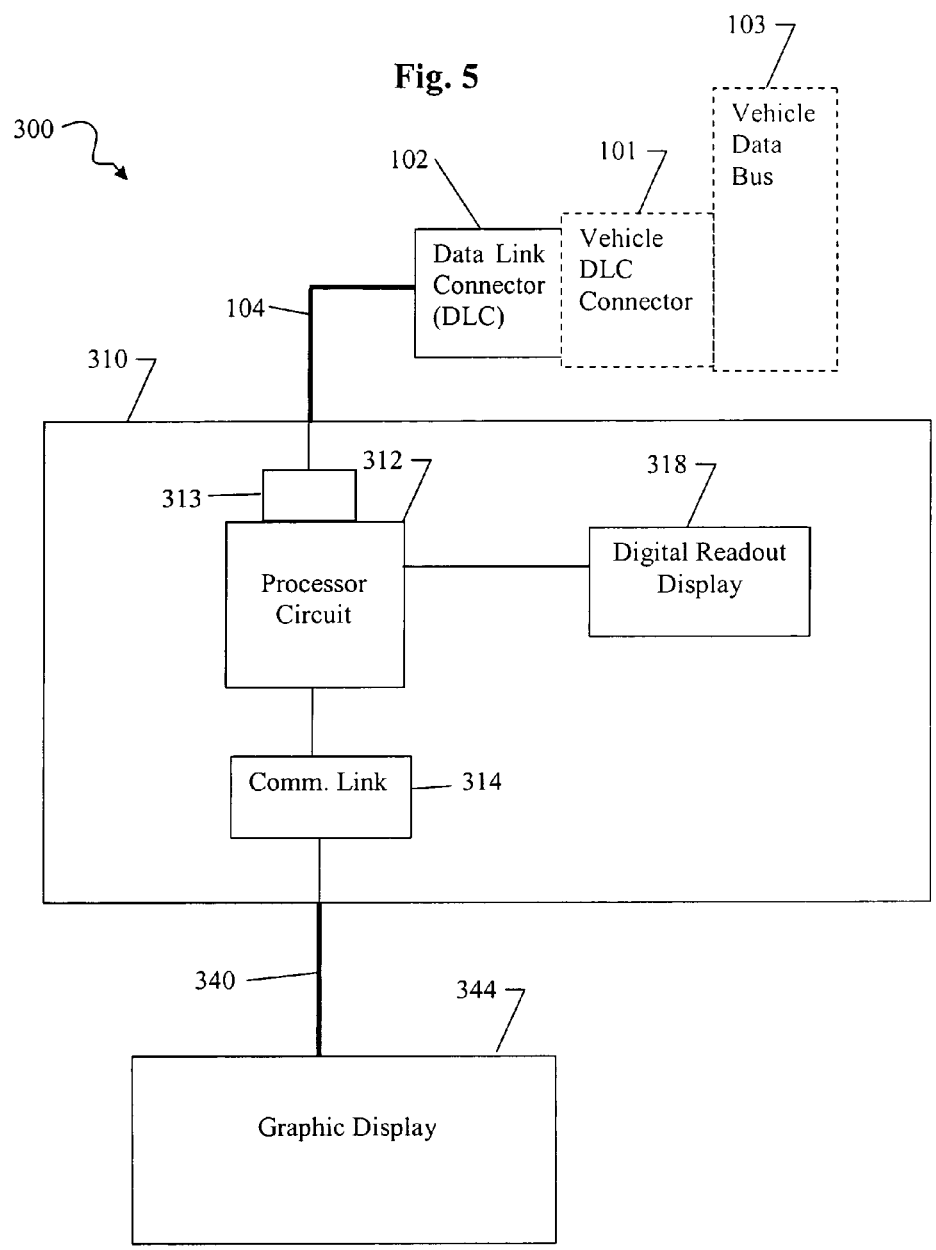
FIG. 6 is a high level block diagram of the third embodiment of the DLC driven display of FIG. 3.

A third embodiment is illustrated in FIGS. 3 and 6. This embodiment is similar to the embodiment illustrated in FIGS. 2 and 5, however, the digital readout 318 is integrated into the housing of the DLC driven display interface 310, and the analog gauge cluster 244 has been replaced by a graphics display 344 on which graphical representations of analog gauges and digital displays are shown in response to commands by the processor circuit 312.

More specifically, the processor 312 is substantially as described above, except that processor 312 executes code to request and receive from the DLC and display a plurality of parameters via integrated digital readout display 318 and via graphical display 344. The DLC communications circuit 313 is substantially as communications circuit 113, described above. The DLC driven display interface 310 comprises a digital readout display 318. The processor 312 formats desired vehicle data and directly communicates the formatted data to digital display 318. The digital display 318 can be any virtually any digital display(s) known in the art, such as a liquid crystal display, LCD, a plasma display, light emitting diodes, LEDs etc.

The graphics display 344 can be any graphical display known in the art, such as a general purpose liquid crystal display (e.g., a VGA type display or a similar display of a different size), a general purpose plasma display, a special purpose LCD display (e.g., one displaying schematic images of a gauge needle and dial having a plurality of different needle positions used to simulate an analog gauge display) etc. The processor 312 is programmed to output data and display the parameters in any number of preselected or user-selected configurations. For example, the processor 312 can output graphics that replicate analog gauges 346a, 346b, a bar graph 364, a digital numeric display 358 etc. Any number of different type displays or configurations thereof can be programmed into the processor 312 and output to the graphics display 344. The processor can be programmed to display a simulated oil pressure gauge 346a, an additional simulated analog display 346b, a digital readout for coolant temperature and transmission temperature 354, 358, and a bar graph 364 illustrative of engine RPM. The simulated analog oil pressure 346a has a title or identification label 348a, graduated markings 350 representative of the oil pressure in pounds per square inch (PSI), and an indicating needle 352 that points to the oil pressure. The display further illustrates a generic analog display 346b next to display 346a. In addition, the display has a digital readout 354 of the coolant temperature and one of the transmission temperature 358. Finally the display 344 has a bar graph 364 that has a title or indicating label 360 to identify the bar graph as one pertaining to engine RPM and a multiplier for the graduated markings. Each bar has a graduated marking 362 indicative of the engine RPM times 1000.

Figure 7:
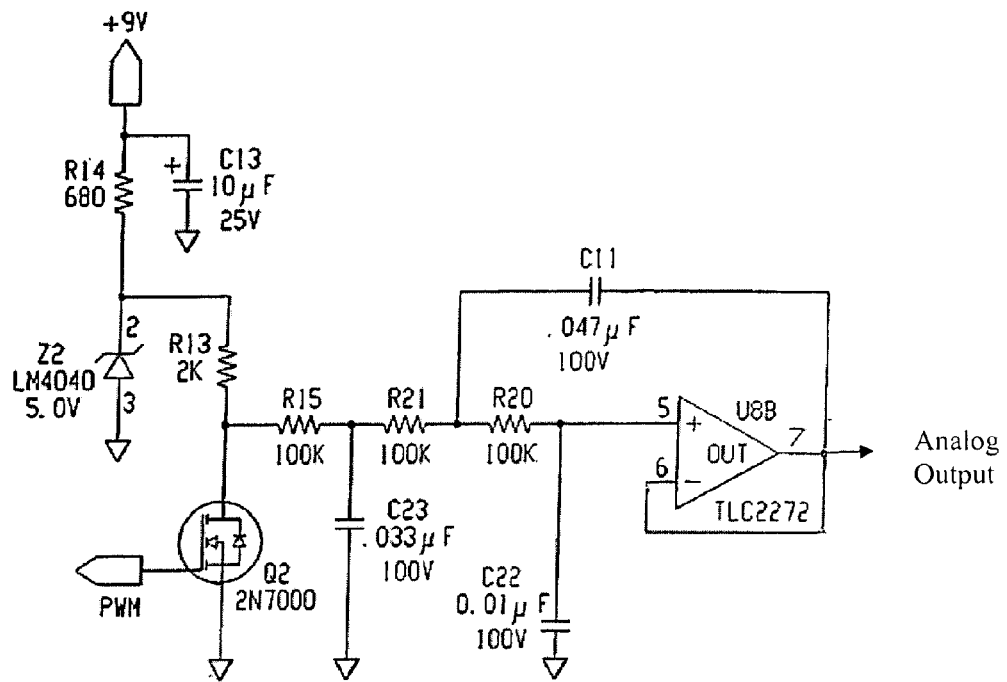
FIG. 7 is a schematic diagram of a low-speed, PWM-based digital to analog conversion circuit.

The digital to analog circuit may be virtually any circuit that converts a digital signal to an analog voltage and can be a conventional discrete digital to analog circuit, or other analog circuits. A PWM-based 5 VDC DAC is shown in FIG. 7. In this circuit, the processor 112, 212, 312 outputs a PWM signal (PWM) having a processor controlled duty cycle. This PWM signal drives a switch (transistor Q2) that is connected to a precision reference, in this case, pull up resistor R13 connected to a precision voltage reference (Z2 and R14) to fix the amplitude of the signal sent to the remainder of the circuit. The voltage chopped by the PWM signal is converted into a DC voltage by an active filter made from U8B and associated components, resistors R15, R21, R20 and capacitors C11, C22 and C23. Thus the digital PWM signal is converted to an analog voltage signal without the need of a conventional digital to analog converter. The alternative digital to analog circuit described above is not meant to limit the present invention in anyway, but is being presented merely to show a low-cost (albeit slow) alternative to a discrete DAC, and it should be understood that a conventional digital to analog converter can be used in the present invention.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, different types and sizes of displays, such as heads up displays, and display images projected on the windshield can be used to display information requested by, received by, and formatted by one of the DLC driven interfaces of the present invention. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An automotive device for displaying vehicle parameters that are transmitted via a vehicle data bus, comprising:
   one or more analog gauges, such that the gauges are additions to the existing gauges of a vehicle;
   a connector that releasably and directly connects to the vehicle data bus;
   a processor in circuit communication between the gauges and the connector; and
   a mounting device secured to the gauges, wherein the mounting device is configured to facilitate securing the gauges to the vehicle.

2. The automotive device for displaying vehicle parameters that are transmitted on a vehicle data bus of claim 1, further comprising a communications circuit in circuit communications with the processor and the connector for establishing communications via the vehicle data bus.

3. The automotive device for displaying vehicle parameters that are transmitted on a vehicle data bus of claim 1, wherein the connector comprises an OBD II connector.

4. The automotive device for displaying vehicle parameters that are transmitted on a vehicle data bus of claim 1, further comprising a digital to analog conversion circuit in circuit communication with the processor for driving the one or more analog gauges.

5. The automotive device for displaying vehicle parameters that are transmitted on a vehicle data bus of claim 1, further comprises a graphical display.

6. The automotive device for displaying vehicle parameters that are transmitted on a vehicle data bus of claim 1, further comprises a liquid crystal display.

7. The automotive device for displaying vehicle parameters that are transmitted on a vehicle data bus of claim 1, further comprises a plasma display.

8. The automotive device for displaying vehicle parameters that are transmitted on a vehicle data bus of claim 1, further comprises a tachometer display.

9. The automotive device for displaying vehicle parameters that are transmitted on a vehicle data bus of claim 1, wherein the gauge displays an oil pressure parameter.

10. The automotive device for displaying vehicle parameters that are transmitted on a vehicle data bus of claim 1, wherein the gauge displays a horsepower parameter.

11. The automotive device for displaying vehicle parameters that are transmitted on a vehicle data bus of claim 1, wherein the gauge displays a torque parameter.

12. The automotive device for displaying vehicle parameters that are transmitted on a vehicle data bus of claim 1, wherein the gauge displays fuel economy parameter.

13. The automotive device for displaying vehicle parameters that are transmitted on a vehicle data bus of claim 1, wherein the gauge displays a temperature parameter.

14. A device for installing additional instrumentation in a vehicle comprising:
   one or more analog gauges, such that the gauges are additions to the existing gauges of the vehicle;
   connection means for releasably and directly connecting to a vehicle data bus;
   means for placing a processing means in circuit communication between the gauges and the connection means; and
   mounting means for mounting the gauges in the vehicle.

15. The device of claim 14 wherein the connection means comprises a connector plugged into the vehicle data bus.

16. The device of claim 15 wherein the connection means comprises an OBD II connector plugged into a mating connector on the vehicle data bus.

17. The device of claim 14 further comprising selection means for selecting one or more vehicle parameters to be displayed on the at least one instrument.

18. The device of claim 14, wherein the mounting means includes means for mounting the display means outside of a factory installed instrument panel in the vehicle.

19. A method for installing additional instrumentation in a vehicle comprising the steps of:
   a. providing an automotive device, comprising:
      i. one or more analog gauges, such that the gauges are additions to the existing gauges of the vehicle;
      ii. a connector that releasably and directly connects to a vehicle on board diagnostic circuitry;
      iii. a communications circuit in circuit communication with the connector for establishing communications with the vehicle on board diagnostic circuitry;
      iv. a processor in circuit communication between the gauges and the communications circuit, the processor receiving vehicle data from the vehicle on board diagnostic circuitry via the communications circuit and causing the display gauges to show a display corresponding to the received vehicle data; and
      v. a mount for securing at least the gauges proximate an instrument cluster of the vehicle;
   b. mounting at least the gauges of the automotive device in view of a driver of the vehicle and outside of a factory installed instrument panel in the vehicle; and
   c. releasably and directly connecting the connector to the vehicle on board diagnostic circuitry, thereby placing the processor in circuit communication with the on board diagnostic circuitry via the communications circuit.

20. The method for installing additional instrumentation in a vehicle of claim 19 wherein the processor and the communications circuit are integral.

21. The method for installing additional instrumentation in a vehicle of claim 19 wherein the connector comprises an OBD II connector.

22. The method for installing additional instrumentation in a vehicle of claim 19, further comprising a digital to analog conversion circuit in circuit communication with the processor for driving the one or more analog gauges.

23. The method for installing additional instrumentation in a vehicle of claim 22, wherein the processor and the digital to analog conversion circuit are integral.

24. The method for installing additional instrumentation in a vehicle of claim 19, further comprises a graphical display.

25. The method for installing additional instrumentation in a vehicle of claim 19, further comprises a tachometer display.

26. The method for installing additional instrumentation in a vehicle of claim 19, wherein the gauge displays an engine revolutions per minute parameter.

27. The method for installing additional instrumentation in a vehicle of claim 19, wherein the gauge displays an indication to the driver to shift gears.

28. The method for installing additional instrumentation in a vehicle of claim 19, wherein the gauge displays an oil pressure parameter.

29. The method for installing additional instrumentation in a vehicle of claim 19, wherein the gauge displays a horsepower parameter.

30. The method for installing additional instrumentation in a vehicle of claim 19, wherein the gauge displays a torque parameter.

31. The method for installing additional instrumentation in a vehicle of claim 19, wherein the gauge displays fuel economy parameter.

32. The method for installing additional instrumentation in a vehicle of claim 19, wherein the gauge displays a temperature parameter.

33. The method for installing additional instrumentation in a vehicle of claim 19 wherein said step of mounting at least the gauge of the automotive device in view of a driver of the vehicle comprises the step of mounting at least the gauge of the automotive device adjacent to and outside of the factory installed instrument panel in the vehicle.

34. The method for installing additional instrumentation in a vehicle of claim 33 wherein the connector comprises an OBD II connector.

* * * * *